United States Patent
Bostick et al.

(10) Patent No.: US 9,999,083 B1
(45) Date of Patent: Jun. 12, 2018

(54) AD-HOC PEER-TO-PEER COMMUNICATIONS TO ACCESS VARIOUS SERVICES VIA A CELLULAR NETWORK

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Brian M. O'Connell, Cary, NC (US)

(73) Assignee: International Business machines Corporation, Armonk, NY (US)

( * ) Notice: Subject to any disclaimer, the term of this patent is extended or adjusted under 35 U.S.C. 154(b) by 0 days. days.

(21) Appl. No.: 15/845,321

(22) Filed: Dec. 18, 2017

Related U.S. Application Data

(63) Continuation of application No. 15/614,861, filed on Jun. 6, 2017, now abandoned.

(51) Int. Cl.
| | |
|---|---|
| *H04W 76/02* | (2009.01) |
| *H04W 72/08* | (2009.01) |
| *H04W 4/02* | (2018.01) |
| *H04W 48/16* | (2009.01) |
| *H04W 12/08* | (2009.01) |
| *H04W 72/04* | (2009.01) |
| *H04L 29/06* | (2006.01) |
| *H04W 84/04* | (2009.01) |
| *H04W 84/18* | (2009.01) |

(52) U.S. Cl.
CPC ......... *H04W 76/023* (2013.01); *H04L 63/107* (2013.01); *H04W 4/02* (2013.01); *H04W 12/08* (2013.01); *H04W 48/16* (2013.01); *H04W 72/048* (2013.01); *H04W 72/085* (2013.01); *H04W 84/042* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 8,108,455 | B2 | 1/2012 | Yeager et al. |
| 8,825,876 | B2 | 9/2014 | Krishnaswamy et al. |
| 2012/0173655 | A1* | 7/2012 | McEntee ............ H04L 67/1097 709/216 |

(Continued)

OTHER PUBLICATIONS

List of IBM Patents or Patent Applications Treated as Related, Appendix P, Filed Herewith, 2 pages.

(Continued)

*Primary Examiner* — Xavier Szewai Wong
(74) *Attorney, Agent, or Firm* — Daniel R. Simek

(57) ABSTRACT

A method for accessing a network. In one embodiment, the method includes at least one computer processor identifying a request from a first device to utilize wireless communication capabilities of a second device to communicate with a wireless network. The method further includes generating a secure peer-to-peer communication link between the first device and the second device. The method further includes establishing a wireless communication link between the second device and the wireless network. The method further includes transmitting one or more communications from the first device to the wireless network, via the wireless communication capabilities of the second device.

1 Claim, 5 Drawing Sheets

(56) References Cited

U.S. PATENT DOCUMENTS

| | | |
|---|---|---|
| 2014/0023026 A1 | 1/2014 | Meyer et al. |
| 2015/0016421 A1 | 1/2015 | Chaturvedi et al. |
| 2015/0201331 A1 | 7/2015 | Raleigh |
| 2016/0174106 A1* | 6/2016 | Lee ...................... H04W 40/20 705/14.63 |

OTHER PUBLICATIONS

Bostick, et al., "Ad-Hoc Peer-To-Peer Communications to Access Various Services via a Cellular Network", U.S. Appl. No. 15/614,861, filed Jun. 6, 2017.

* cited by examiner

AD-HOC PEER-TO-PEER COMMUNICATIONS TO ACCESS VARIOUS SERVICES VIA A CELLULAR NETWORK

BACKGROUND OF THE INVENTION

The present invention relates generally to the field of communication networks, and more particularly to utilizing peer-to-peer communications to access a cellular network.

Users can communicate with other users, access information, data, and computing resources (e.g., programs and applications) via communication networks, such as the Internet and telecommunication, and cellular networks. Access to such networks may be provided as a paid for service (e.g., home-based broadband, cellular services, leased lines, etc.). However, the amount of network bandwidth and services provided to individual users for mobile devices by cellular network providers are usually limited. For example, a user may have an arrangement with a cellular network provider in which a user pays a particular monthly fee in exchange for a particular amount (e.g., quota) of network services and/or service resource, such as bandwidth, talk-minutes, a number of text messages, and a quantity of data (e.g., gigabytes) transmitted to or received by a mobile device. Moreover, some network providers limit the amount of network usage for a particular fee arrangement or service plan. In illustration, a cellular network provider may allow a certain quota of data that a user may send or receive over the communication network for a base fee. If the user exceeds the quota of network usage, then additional fees may be charged to the account of the user. Also, a network provider may also "throttle" (e.g., reduce the transmission speed) the data access of a user in response to a user exceeding various service plan (i.e., subscription) thresholds. In addition, cellular communication coverage by providers varies within an area, and more so from one geography to another geography.

Other network and cellular communication providers can be resellers of network access and/or service resources, such as a mobile virtual network operator (MVNO). A MVNO obtains bulk access to network services at wholesale rates from one or more mobile network operators (MNOs) and subsequently set prices to the subscribers of the MVNO for one or more service resources. Some MVNOs offer network and service resource access on a "pay-as-you-go" basis, pre-payment for a fixed amount of services, or as various service plans.

SUMMARY

According to aspects of the present invention, there is a method, computer program product, and/or system for accessing a network. In one embodiment, the method includes one or more computer processors identifying a request from a first device to utilize wireless communication capabilities of a second device to communicate with a wireless network. The method further includes generating a secure peer-to-peer communication link between the first device and the second device. The method further includes establishing a wireless communication link between the second device and the wireless network. The method further includes transmitting one or more communication from the first device to the wireless network, via the wireless communication capabilities of the second device.

DETAILED DESCRIPTION

Figure 1:
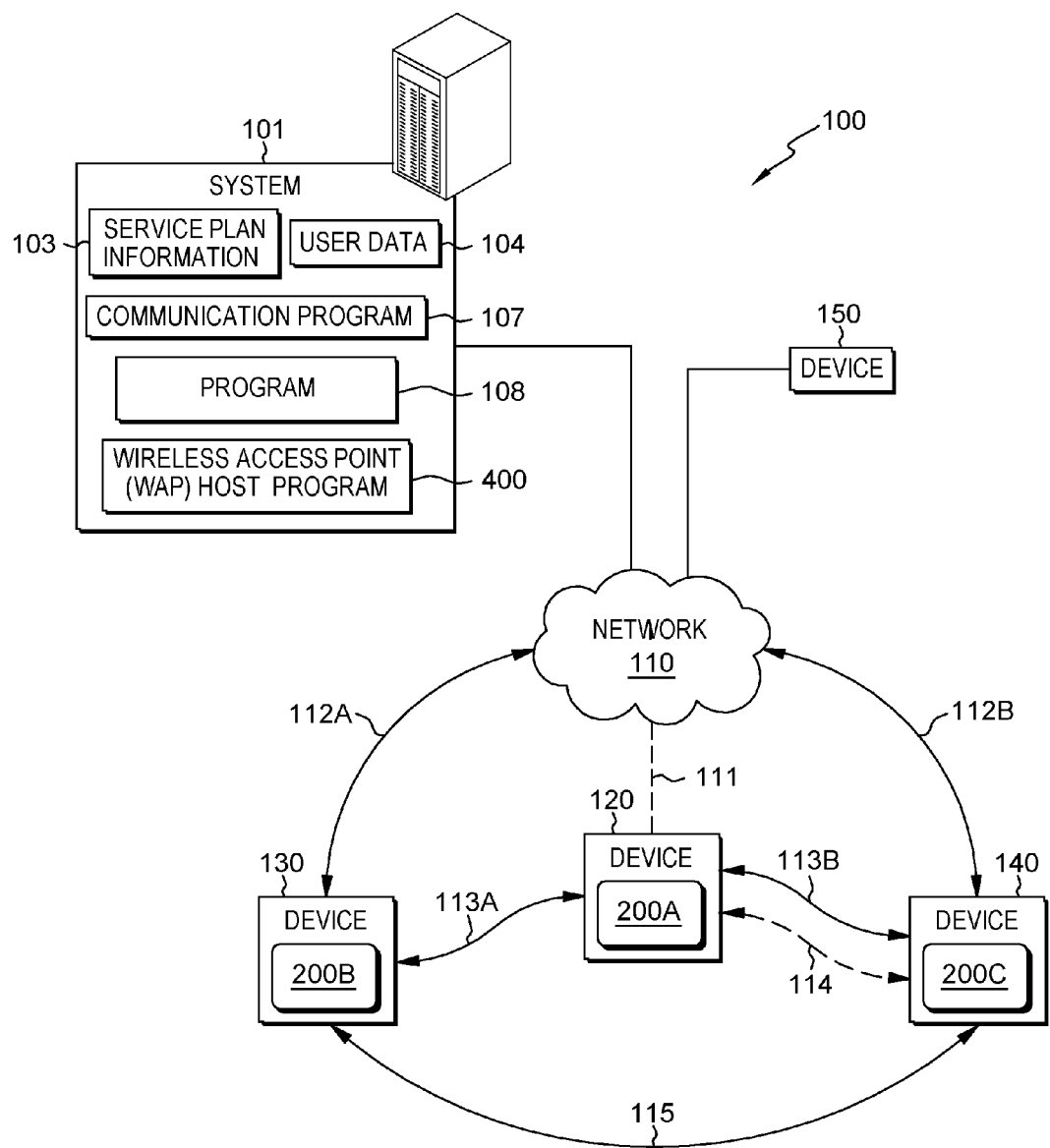
FIG. 1 illustrates a networked computing environment, in accordance with an embodiment of the present invention.

Embodiments of the present invention recognize that some users of mobile computing devices consume their quota of cellular network access and electronic communication service resources (e.g., talk-minutes, a number of text messages, and/or quantities of data transmitted to or received by a mobile computing device) prior to the end of a subscription/service plan period. In response to a user exceeding the quotas of one or more electronic communication service resources within a service plan period, the user incurs additional costs (e.g., overage charges) from the cellular network provider. Overage charges can exceed the unit price associated with a service plan for each additional access of an electronic communication service resource. Alternatively, other users may purchase a larger service plan to avoid overage charges. However, during some service plan periods, a number of users may not fully utilize the quotas of electronic communication service resources, thereby "leaving money on the table." Similarly, a MVNO can have contract periods with a MNO to purchase access to a cellular network and associated service resources. Within some contact periods, a MVNO (i.e., a service provider) can have quotas of electronic communication service resources that are not fully utilized and that expire at the end of the contract (e.g., service plan) period with a MNO.

Embodiments of the present invention recognize that a user can incur additional costs or more quickly consume electronic communication service resource quotas, herein referred to as service resources, of a service plan in response to a user utilizing a mobile computing device outside of an area of coverage (e.g., roaming) of the service provider the user utilizes (e.g., subscribes to). For example, roaming fees are charged on a per-minute basis for wireless voice service, per text message basis, and per Megabyte per second basis for data service and are typically determined within the service provider's (e.g., MNO's) service plan.

Other embodiments of the present invention also recognize that some mobile computing devices, herein referred to as mobile devices, have greater range than other mobile computing devices. Similarly, the number of cellular network providers and telecommunication providers can vary significantly between regions within developed countries. In less developed countries, the number of cellular network providers is often lower, and the cellular communication coverage can be harder to find relative to more developed countries. In addition, in less developed countries, fewer users can afford more advanced mobile devices that have longer ranges or that can reliably communicate at lower signal strengths. Further, the number of users in less developed countries that can afford a service plan is also more limited relative to more developed countries.

Some embodiments of the present invention provide solutions to improve the utilization of service resources associated with a service plan of users of mobile device and/or contracts associated with MVNOs. Other embodiments of the present invention provide solutions to improving cellular communication coverage and/or access to cellular networks for users that may have financial and/or technological constrains, such as older mobile devices, less advanced mobile devices, devices located outside of an area of supported coverage, etc. In one example, individuals located in some countries may not have local access to a doctor but need to get pictures and information about a medical issue to the doctor. By utilizing embodiments of the present invention one or more individuals, through a chain of one or more mobile devices, can ultimately access a cellular network and communicate the pictures and information to the doctor. In another example, a medical device may be transported to an area where the wireless capability of the medical device cannot access a network. Via one or more ad-hoc peer-to-peer communication links, the medical device can access a network to send and receive data.

Embodiments of the present invention provide methods to access one or more cellular networks and one or more networks connected to the one or more cellular networks to improve the utilization of service resources (i.e., electronic communication service resources). Service resources referred to herein include talk-minutes, text messages, and quantities of data transmitted to or received by a mobile device. In addition, embodiments of the present invention also provide various benefits to: a MVNO; a plurality of users of mobile acting as agents for the MVNO, such as hosting wireless access points (WAPs); users of other mobile devices (e.g., clients) seeking to avoid overage charges and roaming fees via a less expensive alternative cellular network service.

Embodiments of the present invention utilize peer-to-peer communication to connect a client mobile computing device, herein referred to as a client device, to link to one or more mobile computing devices hosting WAPs; thereby obtaining access to a cellular network and other connected networks and service resources. In an example, a client device can communicate with multiple WAPs to (i) increase the speed of data transmission (e.g., bandwidth), (ii) use different WAPs for each service resource accessed, and/or (iii) increase the accessibility to a network and one or more service resources. In one instance, multiples WAPs are utilized to increase a speed of data transmission for a single request, such as a streaming video. In another instance, each WAP of a group of WAPs can process requests associated with HTTP/HTTPS requests associated with different portions of a webpage, thereby improving the speed to load the webpage to the client device. In another example, a client device can utilize peer-to-peer communication to connect multiple mobile computing devices hosting WAPs to provide redundancy in case a mobile device hosting a WAP moves out of communication range or stops functioning as a WAP. The technologies and standards utilized for peer-to-peer communication can be different from the technologies and standards utilized to access a network (e.g., a cellular network, a wireless network).

Embodiments of the present invention utilize the creation one or more chains of peer-to-peer communication paths (e.g., hops or links) between WAPs to enable a client device to ultimately link to a mobile device (e.g., a WAP) that has accesses to a network. In some embodiments of the present invention each communication path in the peer-to-peer communication chain operates at different speeds; utilizes different communication types/protocols; employs various security methods, etc. The number of links in a peer-to-peer communication chain is not fixed or limited. In various embodiments of the present invention, some links (e.g., mobile devices) in a chain of peer-to-peer communications independently access a network for a user of linked device while transferring communication requests through the chain of devices. Also, a linked mobile device can access a network to process a portion of a request (e.g., one of the service resources) from the client device.

Embodiments of the present invention also isolate/buffer information within a mobile device acting as a WAP. Isolation ensures that the transfer of information between a client device and the network is secure (e.g., another mobile device cannot access the information); and functionality of a mobile device that hosts a WAP and information being communicated is prevented from affecting the mobile device of the WAP. For example, malware embedded in a communicated (e.g., relayed) e-mail cannot affect the hosting mobile device hosting the WAP.

Further, one skilled in the art would recognize that communication of information to a user is a function of many computing systems. By increasing access and an area of coverage for a cellular communication network and various service resources accessible via one or more connected networks connected to the cellular network, the overall ability of a mobile computing devices to communicate is improved. Further, by isolating and securing information relayed, various peer-to-peer communications among one or more other mobile devices security is improved. As such, the functioning of such a computing system is seen to be improved in at least these aspects.

The present invention will now be described in detail with reference to the Figures. FIG. 1 is a functional block diagram illustrating networked computing environment 100, in accordance with an embodiment of the present invention. In one embodiment, networked computing environment 100 includes: system 101, device 120, device 130, device 140, and device 150, all interconnected over network 110. In some embodiments, networked computing environment 100 includes multiple instances of system 101 and a plurality of instance devices 120, 130, 140, and 150. Different instances of system 101 may be associated with different MVNOs or MNOs. In other embodiments, one or more of: device 120, device 130, and/or device 140 utilize other communication technologies, such as Bluetooth® or WiMax® to communicate with another device that connects to network 110 to access device 150. In another embodiment, one or more of: device 120, device 130, and/or device 140 utilize network 110 to access an instance of system 101 and/or device 150.

In various embodiments, networked computing environment 100 includes a plurality of dynamically established and revoked communication paths that enable device 120, device 130, device 140, and/or network 110 to interconnect. Examples of cellular communications path may include communication paths 111, 112A, and 112B. Examples of peer-to-peer communications path may include communication paths 113A, 113B, 114, and 115. Many modifications to the depicted environment may be made by those skilled in the art without departing from the scope of the invention as recited by the claims.

System 101, device 120, device 130, device 140, and device 150 may be: laptop computers, tablet computers, netbook computers, personal computers (PC), desktop computers, personal digital assistants (PDA), smart phones, wearable devices (e.g., digital eyeglasses, smart glasses, smart watches, smart televisions, etc.), or any programmable computer systems known in the art. In certain embodiments, system 101, device 120, device 130, device 140, and device 150 represent computer systems utilizing clustered computers and components (e.g., database server computers, application server computers, etc.) that act as a single pool of seamless resources when accessed through network 110, as is common in data centers and with cloud-computing applications. In general, system 101, device 120, device 130, device 140, and device 150 are representative of any programmable electronic device or combination of programmable electronic devices capable of executing machine-readable program instructions and communicating with users of system 101, device 120, device 130, device 140, and device 150, via network 110.

In various embodiments, device 120, device 130, and device 140 are representative of mobile devices. In an embodiment, device 120, device 130, and device 140 respectively include configurations 200A, 200B, and 200C. An instance of configuration 200 is representative of a configuration of hardware, software, and data respectively associated with an instance of a mobile device. In a further embodiment, one or more of device 120, device 130, and/or device 140 are other computing devices or devices with embedded computers that can wirelessly communicate, such as Internet-of Things (IoT) devices, medical devices, remote sensors, etc. System 101, network 110, device 120, device 130, device 140, and device 150 may include components, as depicted and described in further detail with respect to FIG. 5, in accordance with embodiments of the present invention.

In one embodiment, system 101 is representative of one or more computer systems and/or telecommunication systems of a mobile virtual network operator (MVNO). In various embodiments, a MVNO is herein referred to as a service provider. In another embodiment, system 101 is representative of one or more computer and/or telecommunication systems of a MNO. In some embodiments, system 101 is representative of a third-party payment processing service that independently processes transactions and compensation for an MVNO and/or a plurality of users that utilize the third-party payment processing service.

System 101 includes: service plan information 103, user data 104, communication program 107, program 108, and an instance of WAP host program 400. System 101 also includes various programs and databases (not shown), such as an operating system (OS), a website interface, a security (e.g., encryption) program, a device mapping/tracking program, one or more programs that monitor service resource utilization, one or more apps for download to host mobile devices and client devices to perform various embodiments of the present invention. System 101 may also include data and information (not shown), such as encryption keys, trust certificates, etc.

One instance of service plan information 103 includes information associated with the users of device 130 and/or device 140. Another instance of service plan information 103 (e.g., a different MVNO or MNO) includes information associated with the users of device 120. Service plan information 103 includes the fee structure and quotas associated with various service resources, such as talk-minutes, text messages (e.g., instance messages, sort message service (SMS), etc.), and data. Data associated with a service plan includes, but is not limited to, emails, multi-media files, Internet access, and information transmitted to or received from one or more apps executing on a mobile device, such as device 120, device 130, and/or device 140 (discussed in further detail with respect to FIG. 2).

User data 104 includes data and information associated with a plurality of users and one or more computing devices respectively associated with each user. In an embodiment, the computing devices of interest are mobile devices or wirelessly connected computing devices, such as smart-phones, laptop computers, tablet computers, wearable devices (e.g., smartwatches, smart glasses, etc.). In one embodiment, user data 104 includes information associated with a mobile device includes an ID of the mobile device, connection speeds, security features, power-on durations, one or more device states (e.g., battery level, signal strength, etc.), mobility (e.g., location) data, data processing bandwidth, installed programs and protocols, etc. Some information associated with a mobile device may be updated on a periodic basis.

In some embodiments, user data 104 includes account information of a user, such as payment information (e.g., bank routing information, account ID, payment types, credit card information, etc.), usage information for a current service plan period, encryption keys for a user, etc. In various embodiments, user data 104 also includes compensation information associated with a user that hosts a WAP for an MVNO. Compensation information may be utilized by program 108 and/or updated by program 108. User data 104 may include preferences related to how a user of a device hosting a WAP prefers to be compensated. In one example, user data 104 may indicate that during the beginning of a plan period that the user of a device hosting a WAP prefers financial compensation. However, toward the end of a service plan period the user prefers compensation that back-fills one or more quotas of the service plan.

In another embodiment, user data 104 includes historic information, such as fees, usage times, service resources accessed, etc., associated with one or more users that use peer-to-peer communication to access a network. Historic information associated with a user may be utilized by program 108 to adjust future fee information. For example, a service provider of system 101 may grant more favorable compensation considerations to users based on the frequency of the user hosting WAPs and/or the quantity of traffic directed to the service provider by a WAP. In a further embodiment, system 101 utilizes predictive analytics/cognitive technologies (not shown) to analyze information within user data 104 to determine a likelihood of a user exceeding a service resource quota or having a surplus service resource quota by the end of the service plan period. In some scenarios, system 101 may advise a user of the likelihood that the user exceeds the utilization of a service resource quota or may retain a surplus service resource quota, thereby enabling a user to determine whether to host a WAP for a service provider or host a WAP to offer excess quota of a service resource.

Communication program 107 is representative of a suite of programs or protocols that enable system 101 to communicate with device 120, device 130, and/or device 140 via network 110. In one embodiment, communication program 107 monitors the activities (e.g., the usage or consumption of service resources) of one or more mobile devices within networked computing environment 100. In response to communication program 107 monitoring a mobile device, system 101 may update user data 104 associated with the mobile device. In a further embodiment, communication program 107 includes a communication program, subsidized by system 101, which enables a mobile device to query a service provider with respect to WAPs in proximity to the client device. In an example, a MVNO associated with system 101 may sponsor an instance of communication program 107 that includes one or more no cost: phone numbers, short code, Internet protocol (IP) addresses, etc. that a client device can utilize to obtain locations for WAPs in proximity to the client device.

Program 108 facilitates charging some users, such as non-subscribers of a service provider and compensating other users of the service provider for providing access to a network and one or more service resources. Program 108 may utilize one or more models or algorithms (not shown) to set and/or determine fees and/or compensation for subscribers of the service provider of system 101 and/or users seeking to access a network and one or more service resources accessible to the service provider. In one embodiment, program 108 utilizes prices and compensation set by a MVNO. In another embodiment, program 108 utilizes dynamic (e.g., supply and demand based) models for fees to access a network, and subsequently one or more service resources for a user of a client device, and compensating users hosting WAPs for the MVNO. In some embodiments, program 108 interacts with program 208 executing on a client device to negotiate fees for one or more service resource accessed via a MVNO. In other embodiments, an instance program 108 processes various transactions associated with a chain of peer-to-peer connection that enable a client device to access a network and one or more service resources. In various embodiments, program 108 is utilized to process various financial transactions associated with instances of WAP client program 300 and WAP host program 400.

In one embodiment, an instance of WAP host program 400 executes on system 101 and includes additional functionality that is excluded from an instance of WAP host program 400 executing on a mobile device, such as device 130 and/or device 140. In one example, an instance of WAP host program 400 enables a service provider (e.g., a MVNO or a MNO) to identify one or more mobile devices that hosts WAPs and identify one or more client devices seeking a connection to the network associated with the service provider. In various embodiments, WAP host program 400 compensates a user that hosts a WAP and charges a user of a client device that accesses one or more service resources accessible via the service provider. In some embodiments, an instance WAP host program 400 that executes on system 101 interfaces with and/or remotely activates one or more programs (not shown) installed on a mobile device to enable the mobile device as a WAP. In a different embodiment, an instance of WAP host program 400 executes on a mobile device acting as a WAP for a MVNO.

In one embodiment, system 101 communicates through network 110 to device 150. In some embodiments, system 101 utilizes one or more aspects of network 110 to wirelessly communicate with device 130, device 140, and/or device 120 via respective communication paths 112A, 112B, and 111. Network 110 can be, for example, a local area network (LAN), a telecommunications network (e.g., a portion of a cellular network), a wireless local area network (WLAN), such as an intranet, a wide area network (WAN), such as the Internet, or any combination of the previous and can include wired, wireless, or fiber optic connections. In general, network 110 can be any combination of connections and protocols that will support communications between system 101, device 120, device 130, device 140, device 150, and the Internet (not shown), in accordance with embodiments of the present invention. In various embodiments, network 110 operates locally via wired, wireless, or optical connections and can be any combination of connections and protocols (e.g., personal area network (PAN), near field communication (NFC), laser, infrared, ultrasonic, etc.).

In one embodiment, device 150 is representative of a mobile device that communicates with another mobile device of networked computing environment 100, such as device 120. Communications between device 150 and the other mobile device can include one or more service resource. In an example, users of device 120 and device 150 can communicate via voice; text messages; and/or data, such as video chats, e-mails, sending and receiving pictures, etc. In another embodiment, device 150 is representative of one or more portions of the Internet, such as a server that hosts a website or an e-commerce site. In some embodiments, device 150 is representative of a computing system (e.g., a host) at a fixed location that can be accessed via an app of a client device. In an example, device 150 may be a business, an office of a doctor, a bank, a university, a government agency, an emergency response provider, etc. In various embodiments, device 150 is representative of other devices that include computing capabilities, such as a medical device, a remote weather station, an IoT device, a vehicle, etc.

Figure 2:
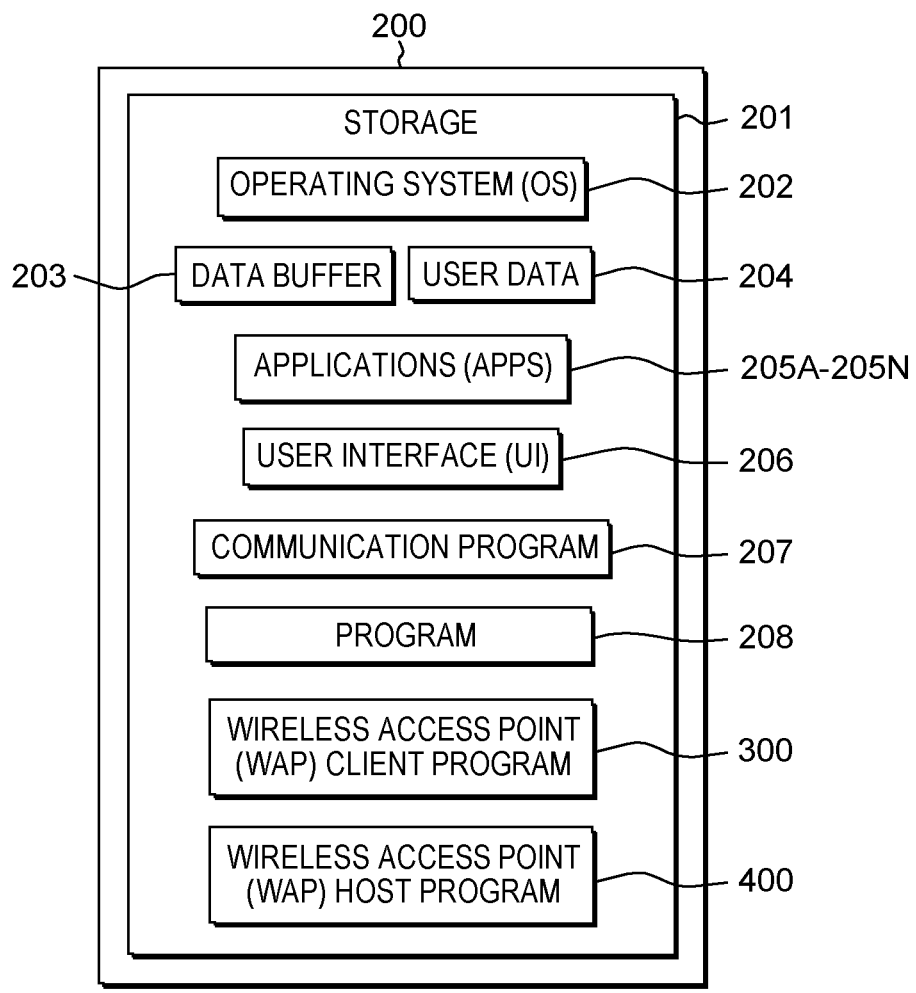
FIG. 2 illustrates an example of a configuration of one or more mobile devices utilized within networked computing environment 100, in accordance with an embodiment of the present invention.

FIG. 2 is an illustrative example of a configuration associated with one or more mobile devices practicing embodiments of the present invention. In an embodiment, an instance of storage 201 includes both volatile memory and persistent storage. An instance of configuration 200 includes various software, data, and at least one data buffer associated with storage 201 respectively associated with an instance of a mobile device. For example, configuration 200A is associated with device 120, configuration 200B is associated with device 130, and configuration 200C is associated with device 140. In some embodiments, storage 201 also includes data and information associated with one or more apps of a mobile device and/or hardware elements of the mobile device, such as a camera (not shown). Examples of data that storage 201 may include are: a web browsing history, music files, video files, pictures, a list of contacts and related information (e.g., phone numbers, street addresses, e-mail addresses, etc.).

In one embodiment, configuration 200 includes OS 202, data buffer 203, user data 204, a plurality of apps (e.g., apps 205A thru 205N), user interface (UI) 206, communication program 207, program 208, WAP client program 300, and WAP host program 400 stored within storage 201. In various embodiments, each instance of device 120, device 130, and device 140 may include a custom instance of configuration 200. In some embodiments, various aspects of configuration 200 are common among devices 120, 130, and 140, such as an instance of program 208. An instance of WAP host program 400 within an instance of configuration 200 includes some capabilities of WAP host program 400 of system 101.

In an embodiment, OS 202 is an operating system that is compatible with the hardware of a respective mobile device. In one embodiment, an instance of data buffer 203 are storage locations of a WAP that temporarily hold data and/or information in transit between one mobile device or a network to another mobile device. The data and/or information held within data buffer 203 can be associated with one or more service resources. Data and/or information held within data buffer 203 may also include information related to a user or communications with another device or system. In various embodiments, data buffer 203 receive encrypted data and is the data is isolated from access by a user mobile device hosting a WAP. In another embodiment, an instance of data buffer 203 is allocated within a client device and is utilized to temporarily store data transmitted from or received to the client device. In some embodiments, access to an instance of data buffer 203 is restricted to instances of WAP client program 300, WAP host program 400, and/or communication program 207. In an embodiment, data buffer 203 is purged on a periodic basis, such as by a function of OS 202, communication program 207, or in response to one or more actions of WAP host program 400.

In one embodiment, an instance of user data 204 includes data and information associated with a mobile device of a user or a wirelessly connected computing device. In an example, user data 204 includes information associated with a mobile device, such as an ID, a list connection types and speeds, installed security features, power-on durations, mobility (e.g., location) data, data processing bandwidth, installed apps and programs, communication protocols, one or more device states (e.g., battery level, signal strength, etc.) etc. In another example, user data 204 also includes one or more user preferences, such as triggers or thresholds utilized by an instance of WAP client program 300 and/or WAP host program 400. Examples of triggers and thresholds includes a level of battery power at which WAP host program 400 terminates, a range of fees that is acceptable to a user for various connection speeds and/or service resources. In some embodiments, user data 204 includes account information of a user such as, payment information, usage information for a current service plan period, encryption keys for a user, etc. Payment information may include a user ID and password for a third-party payment processing service, payment types, and account IDs (e.g., credit card, prepaid card), etc.

Apps 205A thru 205N may include apps, such as a web browser, an office productivity suite, one or more telecommunication programs, an instant messaging (IM) app, a navigation app, a map app, one or more programs/apps associated with a service provider, a banking app, a third-party payment app, an encryption app, etc. Apps 205A thru 205N may also include various entertainment apps, such as music apps, picture apps, movie apps, games, etc. In an embodiment, one or more apps of apps 205A thru 205N are downloaded from an instance of system 101 to enable various embodiments of the present invention. In one example, app 205H is a map app downloaded from system 101 to show the locations, information, and/or movements of mobile devices hosting WAPs within a distance of a client device.

In one embodiment, an instance of UI 206 is a graphical user interface (GUI) or a web user interface (WUI). UI 206 can display text, documents, forms, web browser windows, user options, application interfaces, and instructions for operation, and include the information, such as graphic, text, and sound that a program presents to a user. In another embodiment, and instance of UI 206 is generated by an executing app or program of the mobile device. In addition, UI 206 controls sequences/actions that the user employs to input and/or modify information included in an instance of user data 204, WAP client program 300, and/or WAP host program 400. In various embodiments, UI 206 displays one or more icons representing apps installed on a mobile device. In addition, UI 206 can control sequences of actions that the user utilizes to respond and/or confirms actions associated with one or more apps, an instance of WAP client program 300, and/or an instance of WAP host program 400.

In some embodiments, a user of a mobile device interacts with UI 206 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program (e.g., a web browser) generates UI 206 operating within the GUI environment of the mobile device. UI 206 accepts input from a plurality of input/output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions, an instance of UI 206 may receive input in response to a user of the mobile device utilizing natural language, such as written words or spoken words, which the mobile device identifies as information and/or commands.

Communication program 207 is representative of a suite of programs or protocols that enables wireless communications. In an example, communication program 207 includes support for Bluetooth®, WiMax®, 3G, 4G, LTE, and other wireless communication technologies, standards, and protocols. Multiple aspects of communication program 207 can execute concurrently, such as a user of one mobile device can both host a WAP and talk with another user via network 110. In one embodiment communication program 207 enables a mobile device, such as device 120, device 130, and/or device 140 to wirelessly communicate with network 110. In another embodiment, communication program 207 enables mobile devices, such as device 120, device 130, and/or device 140 to establish secure wireless peer-to-peer communication paths (e.g., links) with one or more mobile devices. In an example, communication program 207 may also utilize tunneling protocols, a transparent proxy, establish an ad-hoc virtual private network (VPN), use a virtual private LAN service, and/or utilize secure shell (SSH) to establish one or more secure wireless peer-to-peer communication paths.

In some embodiments, an aspect of communication program 207 includes encrypting or encapsulating information that is transmitted utilizing peer-to-peer communications. In an example, an instance of communication program 207 is configured, based on the information being communicated, to apply one or more layers of encryption (e.g., public-private key pairs), other cryptographic techniques, and/or a data encapsulation technique. In various embodiments, communication program 207 utilizes data buffer 203 to temporarily store (e.g., cache) communication received from one mobile device or network prior to forwarding (e.g., retransmitting) the received communication to another mobile device or network.

Program 208 is a program that includes various functions that enables one or more users to initiate and complete transactions associated with utilizing a WAP, accessing a network, and utilizing one or more service resources. Program 208 may utilize information included in user data 204 to initiate and complete transactions between one or more mobile device users and/or a service provider. In one embodiment, program 208 include functions that interface with a program on another device or system to negotiate a fee as opposed to utilizing set fees. In another embodiment, program 208 activates an instance of UI 206 to obtain input or decisions from a user of a mobile device. In some embodiments, program 208 interfaces with a third-party payment processing service to initiated payment for transactions associated with a request to access a network. In various embodiments, program 208 interfaces with multiple entities and process different transactions, such as paying a token amount to a user of each mobile device in a chain of peer-to-peer communications and a different amount to a service provider based on network and service resource utilization, such as interfacing with program 108 of system 101.

WAP client program 300, a program that enables a client device to utilize peer-to-peer communication with another device to obtain access to a network and one or more service resources. In an embodiment, WAP client program 300 utilizes information and data received from one aspects of a client device to determine whether to utilize peer-to-peer communication with another device to obtain access to a network. In some embodiments, an instance of WAP client program 300 executing on one mobile device interfaces with an instance of WAP host program 400 executing on another mobile device, that is not the client device (e.g., another WAP). Thus, generating a chain of mobile devices utilizing peer-to-peer communications, such as establishing an ad-hoc VPN, that enables the client device ultimately accesses a network of a service provider. In various embodiments, multiple instances of WAP client program 300 execute concurrently. In an example, each instance of WAP client program 300 executing on the mobile device may be associated with a different service resource that is accessed.

In another embodiment, WAP host program 400 is a program that enables a mobile device to host a WAP, establishes peer-to-peer communication with a client device, and interfaces with a service provider to enable the client device to access a network and one or more service resources. In one scenario, WAP host program 400 actively (e.g., continuously or intermittently) broadcasts information associated with the WAP, and identifies the WAP to potential client devices as a WAP to access a service provider. In another scenario, an instance of WAP host program 400 that executes on the mobile device to host a WAP and passively listens for one or more client devices to request access to a network or service provider. In various scenarios, an instance of WAP host program 400 can be paused or set as inactive to await a trigger. In an example, a service provider (e.g., system 101) can activate or "wake up" instances of WAP host program 400 installed on one or more host mobile devices to host a WAP for access to the network of the service provider.

In various embodiments, WAP host program 400 also negotiates compensation for access to a service provider and/or one or more service resources with the client device. In addition, WAP host program 400 utilizes information from various sources to determine whether a change is identified that can affect a network connection. WAP host program 400 can respond to a change that affects access to a network by transmitting a notification to one or more mobile devices and/or a service provider (e.g., system 101). In some embodiments, some instances of WAP host program 400 establish a chain of peer-to-peer communications among mobile devices that eventually establishes access to a network between a client device and a service provider.

In a further embodiment, an instance of WAP host program 400 executing on system 101 utilizes network 110 and/or a no-cost communication method to identify one or more client devices that are seeking to access one or more service resources via a service provider different from the service provider associated with the mobile device. In response, system 101 can activate or "wake up" an instance of WAP host program 400 installed on one or more host mobile devices to establish a WAP for a client device to access the network of the service provider.

Figure 3:
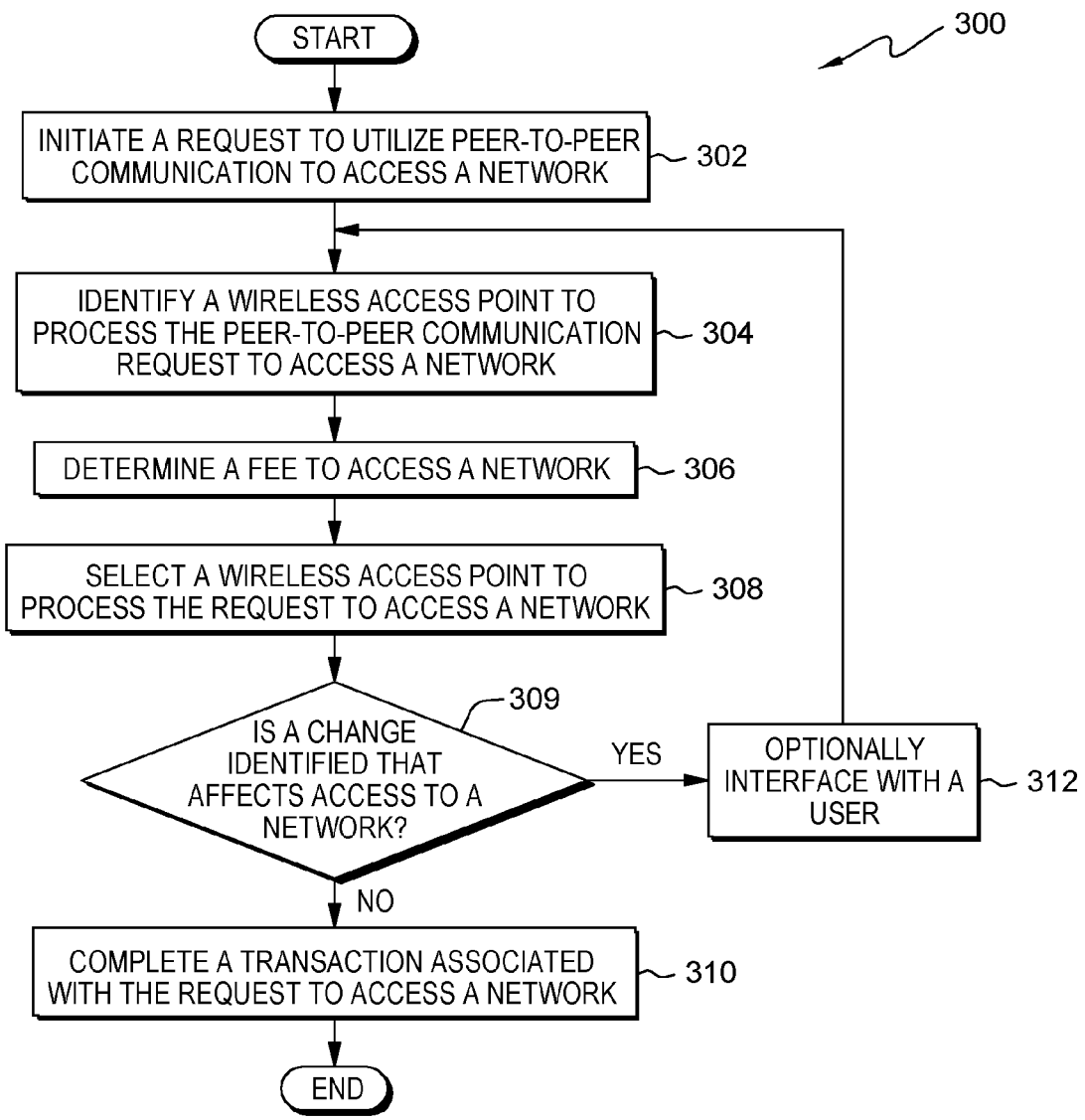
FIG. 3 depicts a flowchart of the operational steps of a client program to access a wireless access point hosted by another mobile device, in accordance with an embodiment of the present invention.

FIG. 3 is a flowchart depicting operational steps for WAP client program 300, a program that enables a client device to utilize peer-to-peer communication with another mobile device to obtain access to a network and one or more service resources, such as talk, text, and data. In some embodiments, WAP client program 300 automatically negotiates a fee to access a network and one or more service resources. In other embodiments, WAP client program 300 utilizes input from a user of the client device prior to accepting a fee to access a network and one or more service resources.

In step 302, WAP client program 300 initiates a request to utilize peer-to-peer communication to access a network. In one embodiment, a user of a mobile device (e.g., device 120) utilizes an instance of UI 206 to manually initiate a request to utilize peer-to-peer communication to access a network and communicate with another computing device, such as communicating with a user of device 150. In another embodiment, WAP client program 300 utilizes one or more user preferences stored in an instance of user data 204 of the client device, and one or more states associated with the client device to determine whether to initiate a request to utilize peer-to-peer communication to access a network. In an example, if WAP client program 300 determines, based on information obtained from an aspect of communication program 207, that a user of device 120 may incur additional costs (e.g., a roaming charge, an overage charge, etc.) to access a service resource, then WAP client program 300 initiates a request to utilize peer-to-peer communication to access a network or a service provider. In addition, WAP client program 300 identifies other information associated with the request to utilize peer-to-peer communication to access a network, such as information encryption methods and available communication protocols.

In some embodiments, WAP client program 300 initiates two or more requests to utilize peer-to-peer communications to access a network. In one example, WAP client program 300 initiates three requests to utilize peer-to-peer communications to access a network, where each peer-to-peer request is associated with a different service resource. In another example, WAP client program 300 initiates two or more requests to utilize peer-to-peer communications to access a network to ensure one or more aspects of a network connection, such as a minimum bandwidth, data rate, and/or reliability of a connection to the network. In other embodiments, WAP client program 300 "listens" for WAPs and determine whether a WAP advertises one or more fees to access a network or service resource. If WAP client program 300 determines that a WAP offers one or more fees within a threshold value set by a user of device 120, then WAP client program 300 initiates a request to utilize peer-to-peer communication to access a network. Referring to FIG. 1, in an example, device 120 accesses network 110 (dashed line 111) at one price for a service resource, if WAP client program 300 determines that device 140 can access network 110 (double-headed line 112B) to obtain a service resource at a lower price, then WAP client program 300 initiates a request to utilize peer-to-peer communication with device 140 to access network 110.

Still referring to step 302 in a further embodiment, an instance of WAP client program 300, executing on a non-client mobile device, initiates a request to utilize peer-to-peer communication to interface with an instance of WAP host program 400 of another mobile device to establish a link in a chain of wireless connections. The chain of peer-to-peer connections enables a client device to access a network. A mobile device that is a link in a chain of peer-to-peer communications is not required to be an active WAP. In an example, referring to FIG. 1, device 120 is out of peer-to peer communication range of device 130, but device 120 is within peer-to peer communication range of device 140. However, in this example device 140 is not offering access to network 110. If device 140 is within peer-to-peer communication range of device 130 and is configured for peer-to-peer communication relaying, then an instance of WAP client program 300 executing on device 120 can request to establish peer-to-peer communicate with an instance of WAP host program 400 executing on device 140. Device 140 caches the communications (e.g., request) of device 120 in data buffer 203. Subsequently, an instance of WAP client program 300 executing on device 140 can request peer-to-peer communication with device 130 utilizing an instance of WAP host program 400 executing on device 130; thereby forwarding the request of device 120, cached in data buffer 203 of device 140, to device 130.

In step 304, WAP client program 300 identifies a wireless access point to process the peer-to-peer communication request to access a network. In one embodiment, WAP client program 300 identifies a WAP to process the peer-to-peer communication request based on "listening" for signals from other mobile devices broadcasting (e.g., beaconing, advertising, etc.) the capability to provide peer-to-peer communication to access a network. In another embodiment, WAP client program 300 utilizes a respective instance of communication program 207 of the client device to broadcast a request for peer-to-peer communication to access a network and awaits a response from one or more mobile devices in a proximity that host a WAP (e.g., execute instance of WAP host program 400). In various embodiments, WAP client program 300 identifies additional information associated with a WAP, such as available bandwidth, available wireless communication protocols, a duration of time that a WAP (e.g., a host mobile device) will maintain hosting peer-to-peer communications, security measures available for peer-to-peer communications, and security measures available for accessing a network. Other information associated with the WAP may include a service provider (e.g., MVNO, MNO) associated with the WAP, fees for utilizing the WAP, capabilities related to communicating with the WAP, etc.

In a further embodiment, WAP client program 300 interfaces with an app (e.g., app 205H) of the client device or inputs an identifier (e.g., an IP address, a short code, a phone number) to an instance of communication program 207 to contact a service provide associated with system 101 without incurring a cost. In response, WAP client program 300 may receive information for display via an instance of UI 206, such as locations (e.g., positions) of one or more mobile devices hosting WAPs, a duration of hosting a WAP, available communication protocols of a mobile device, information associated with fees of the WAP, etc. In some scenarios, WAP client program 300 identifies one or more mobile devices that can provide access to a network are within peer-to-peer communication range of a client device, such as device 120. In other scenarios, WAP client program 300 determines that zero mobile devices within peer-to-peer communication range of a client device (e.g., device 120) that can provide access to a network. In response to not identifying a mobile device to provide access to a network within peer-to-peer communication range, WAP client program 300 activates UI 206 and presents the user of the client device a map of locations of WAPs associated with a service provider that provided access to a network utilizing peer-to-peer communication. Thus, enabling a user of a client device the opportunity to move towards a WAP and utilizing peer-to-peer communication to access a network.

In step 306, WAP client program 300 determines a fee to access a network. The fees for a transaction (e.g., access to a network) may vary based on a service resource to access; a number of WAPs in an area offering peer-to-peer communications; a wireless networking protocol/standard utilized, such as 3G, 4G, LTE; one or more dictates by a service provider; one or more dictates of a user of the WAP; a number of host mobile devices utilized to link (e.g., in series and/or in parallel) to a network or a combination thereof. WAP client program 300 may determine/negotiate compensation for each WAP utilized and each service resource accessed.

In one embodiment, WAP client program 300 determines one or more fees to access a network based on information received from a mobile device hosting a WAP, such as prices or ranges of prices set by WAP host program 400 and an instance of program 208 executing the mobile device hosting the WAP. In another embodiment, WAP client program 300 determines one or more fees to access a network based on information received from a service provider, such as system 101. In some embodiments, WAP client program 300 includes one or more dictates associated with a transaction, such as no payment or partial payment for a loss of network access, distributing peer-to-peer activity among WAPs, compensation for each link or device in a communication chain, and compensation for backup or standby WAPs.

In various embodiments, WAP client program 300 utilizes an instance of program 208 on the client device to automatically negotiate a fee to access a network based on one or more user preferences stored in an instance of user data 204 of the client device. In other embodiments, if WAP client program 300 cannot negotiate a fee (e.g., cost) to access a network within the constraints or user preferences within an instance of user data 204 of the client device (e.g., device 120), then WAP client program 300 activates UI 206 to obtain input from the user of the client device. Input to WAP client program 300 may include: a counter offer by a user for a network connection, selecting another wireless communication protocol/standard, delaying the selection of a WAP, or aborting the current request for network access and reactivating a wireless network connection, such as wireless connection 111 between device 120 and network 110.

In step 308, WAP client program 300 selects a wireless access point to process the request to access a network. In response to selecting one or more WAPs, WAP client program 300 utilizes one or more aspects of communication program 207 to establish secure peer-to-peer communications with the selected one or more WAPs. In response to establishing a peer-to-peer communication path that accesses a network, WAP client program 300 processes the network communications and utilization of one or more service resources.

In one embodiment, WAP client program 300 selects a WAP process the request for peer-to-peer communication to access a network based on minimizing a cost to a user of the client device. In another embodiment, WAP client program 300 selects one or more WAPs to process the request for peer-to-peer communication to access a network based on a factor other than minimizing cost, such as bandwidth, security, a duration of time available for hosting peer-to-peer communications, and/or peer-to-peer connection reliability (e.g., signal strength). WAP client program 300 may also select one or more WAPs as standby or backup WAPs to ensure access to a network. In a further embodiment, WAP client program 300 utilizes multiple WAPs to improve the response time (e.g., increase the bandwidth) of a request for data, such as accessing a webpage by distributing aspects of the webpage among WAPs. In an example, WAP client program 300 utilizes multiple WAPs to distribute the HTTP/

HTTPS requests that comprise the webpage, such as a primary website, advertisement links, web services, web feeds, media files from different locations, etc.

In various embodiments, WAP client program 300 also utilizes an instance of program 208 on the client device to establish transactions with one or more entities (e.g., mobile devices) to access the network. In some scenarios, WAP client program 300 utilizes an instance of program 208 on the client device to access a third-party payment processing service (not shown). In addition, WAP client program 300 establishes the details of a transaction between a client device and one or more WAPs for access to a network and one or more service resources.

In some embodiments, WAP client program 300 activates UI 206 for a user of the client device to select a WAP, such as via a list or from among the WAPs depicted on a map or an app associated with a service provider. In one scenario, WAP client program 300 utilizes a user preference within an instance of user data 204 of the client device to activate UI 206 to obtain a selection of a WAP from the user of the client device. In another scenario, WAP client program 300 determines that the selection of a WAP is delayed by a user of the client device and awaits additional input. In an example, a user of a client device utilizes the map of WAPs to move to a location that includes one or more WAPs available for peer-to-peer communications to access a network that are less costly, have a higher bandwidth, have better security, and/or can access a network for a longer duration of time.

In decision step 309, WAP client program 300 determines whether a change is identified that affects access to a network. Decision step 309 executes concurrently with the network communications and utilization of one or more service resources associated with the request. In various embodiments, WAP client program 300 pauses at decision step 309 to obtain data and information associated with access to a network to determine whether a change is identified that affects the access to the network. Data and information that affects the access to a network includes, but is not limited to, a notification received from an instance of WAP host program 400, a changing to a fee of one or more service resources, the signal strength of a peer-to-peer communication path, a reduction of available bandwidth, identifying one or more new WAPs for peer-to-peer communication in proximity of the client device, and losing one or more new WAPs in proximity of the client device. In some scenarios, WAP client program 300 identifies a change that negatively affects access to a network by the client device, such as an increase in a fee or a reduction of available bandwidth. In other scenarios, WAP client program 300 identifies a change that beneficially affects access to a network by client device, such as a decrease in a fee or a new WAP that is available for a longer duration of time.

In some embodiments, WAP client program 300 utilizes information within an instance of user data 204 of the client device to determine a threshold that triggers the identification of a change that affects access to a network. Thresholds for identifying a change that affects access to a network may include observing a minimum signal strength for a dictated period of time, determining a change in a fee for access to a service resource of more than a dictated percentage, a bandwidth change criterion, comparing an estimated usage duration of time for a peer-to-peer communication as compared to an available duration of time indicated by a hosting mobile device for the peer-to-peer communication, etc.

In decision step 309, responsive to determining that a change is not identified that affects access to a network (No branch, decision step 309), WAP client program 300 completes a transaction associated with the request to utilize peer-to-peer communication to access a network (step 310). In some embodiments, WAP client program 300 continues to pause at decision step 309 if a change is not identified that affects access to a network, then WAP client program 300 proceeds to Step 310 in response to completing the request initiated in Step 302. In an example, if WAP client program 300 determines that the request for data by app 205B from device 150 is complete, then WAP client program 300 proceeds to step 310.

In step 310, WAP client program 300 completes a transaction associated with the request to access a network. In one embodiment, WAP client program 300 indicates to an instance of program 208 on a client device that a transaction associated with a request to utilize peer-to-peer communications to access a network is complete and authorizes a payment. A payment for the transaction may be processed by a third-part payment processing service, such as program 108 of another instance of system 101. In one example, WAP client program 300 authorizes compensation to the users of one or more mobile devices (e.g., the user of the WAP connected to network 110, users of mobile devices that link a client device to the WAP connected to network 110) utilized to access a network and one or more service resources. In some embodiments, WAP client program 300 activates UI 206 to obtain information and/or authorization from a user of the client device, such as a user ID and password for a third-party payment processing service.

In another embodiment, WAP client program 300 interfaces with a service provider, such as system 101 to authorize compensation for a transaction. In some embodiments, WAP client program 300 determines additional information associated with a transaction, such as a percentage of access to a network or for a service resource processed by each selected WAP, and which, if any, WAPs lost or terminated a connection to a network. The additional information may affect the compensation associated with the use of a WAP. In other embodiments, WAP client program 300 receives information from a service provider indicating the total cost of the transaction.

Referring to decision step 309, responsive to determining that a change is identified that affects access to a network (Yes branch, decision step 309), WAP client program 300 optionally interfaces with a user (step 312).

In step 312, WAP client program 300 optionally interfaces with a user. In one embodiment, WAP client program 300 utilizes UI 206 to indicate to a user of a mobile device, such as device 120 that a notification (discussed in further detail with respect to FIG. 4, step 416) was received from a WAP utilized to access a network and one or more service resources. In another embodiment, WAP client program 300 identifies a change that affects access to a network and notifies the user via an instance of UI 206. In some embodiments, WAP client program 300 determines, based on information within user data 204 and/or previously determined fees associated with another WAP, that WAP client program 300 automatically compensates for an identified change that affects a network connection. Therefore, WAP client program 300 does not interface with the user of the client device. Subsequently, WAP client program 300 loops to one or more of steps 304, 306, and/or 308.

Figure 4:
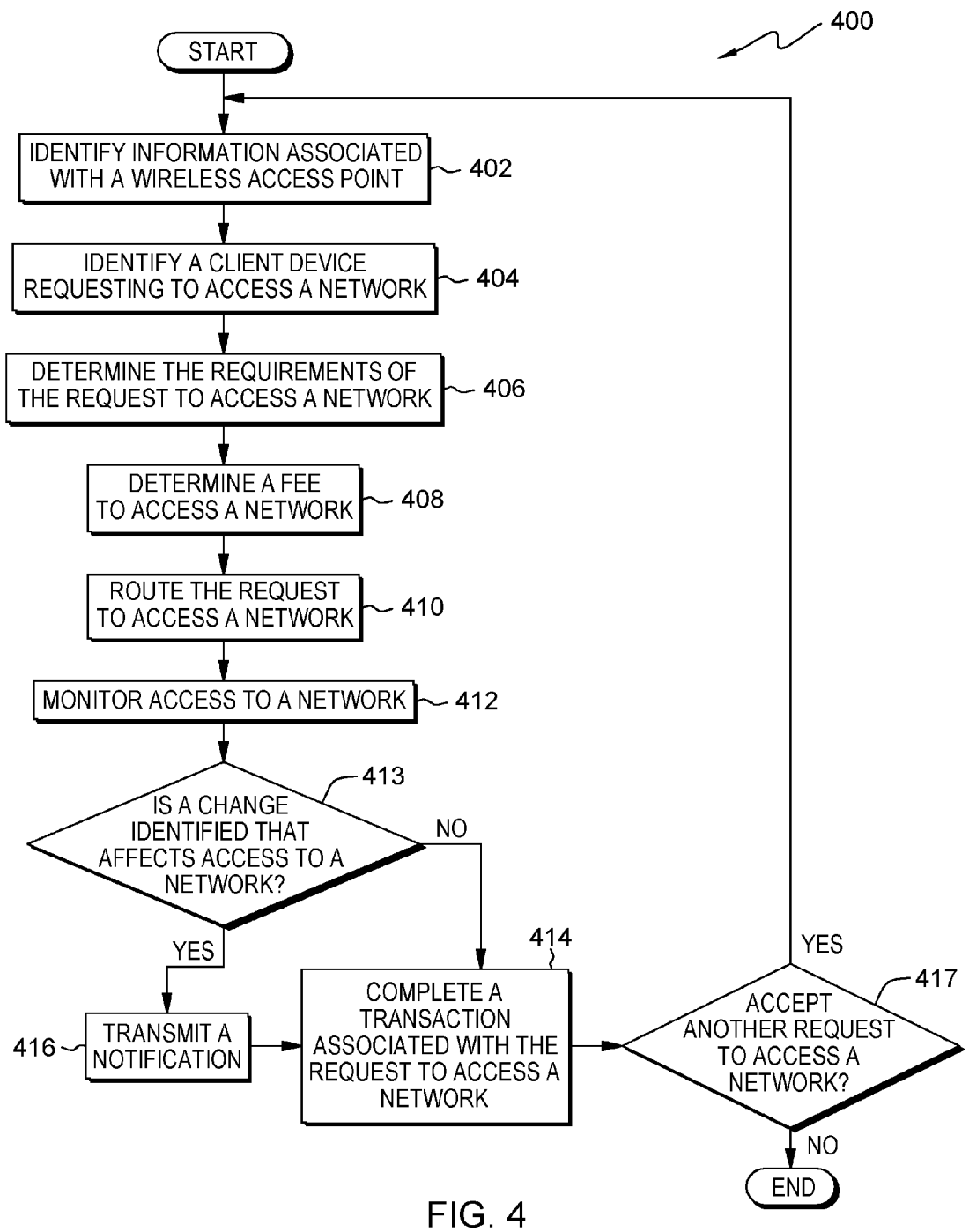
FIG. 4 depicts a flowchart of the operational steps of wireless access point hosting program, in accordance with an embodiment of the present invention.

FIG. 4 is a flowchart depicting operational steps for WAP host program 400, a program that enables a mobile device to act as a wireless access point and process communications between another mobile device and a service provider of the mobile device, in accordance with embodiments of the present invention. In one embodiment, an instance of WAP host program 400 executes on system 101 and utilizes network 110 to identify one or more client devices that are trying to identify a communication path to access a network and one or more service resources. In response, system 101 can activate or wake up an instance of WAP host program 400 installed on one or more host mobile devices to establish a WAP for access to the network of the service provider. In another embodiment, an instance of WAP host program 400 executes on a mobile device and enables the mobile device to host a WAP.

In various embodiments, an instance of WAP host program 400 also negotiates compensation for access to a service provider and/or one or more service resources with the other mobile device. In some embodiments, and instance of WAP host program 400 executes concurrently with an instance of WAP client program 300, as such multiple mobile devices hosting WAPs can generate a chain of peer-to-peer communications, such as an ad-hoc VPN.

In step 402, WAP host program 400 identifies information associated with a wireless access point. In one embodiment, WAP host program 400 identifies information associated with a WAP based on information included in an instance of user data 204 associated with a mobile device hosting a WAP for a service provider. Information within an instance of user data 204 of a mobile device may include an account of a user, one or more user preferences and/or thresholds of a user, and configuration information of the mobile device. In another embodiment, WAP host program 400 identifies information associated with a WAP based on information included user data 104 of system 101, such as a location of a mobile device hosting a WAP for a service provider. Information within an instance of user information 104 of a mobile device may include an account of a user, service plan information (e.g., quota usage information for a current plan period), one or more user preferences and/or thresholds of a user, and configuration information of the mobile device.

In some embodiments, an instance of WAP host program 400 on system 101 identifies other information associated with a WAP, such a location of a mobile device hosting a WAP, a state of one or more features of the mobile device, etc. The location of a mobile device may be determined by information obtained from network 110 or provided by an installed app. In various embodiments, an instance of WAP host program 400 executes one a mobile device to establish a chain of peer-to-peer communications without an active connection to a network or a service provider.

In step 404, WAP host program 400 identifies a client device requesting to access a network. In one embodiment, WAP host program 400 identifies a client device requesting access to a network based on receiving a signal from a client device executing an instance of WAP client program 300. In another embodiment, WAP host program 400 identifies one or more client devices requesting access to a network that are within peer-to-peer communication range based on receiving information from a service provider (e.g., system 101). In some embodiments, an instance of WAP host program 400 receives a request to route a request to access a network from an instance of WAP client program 300 executing on the mobile device hosting a WAP. In various embodiments, an instance of WAP host program 400 identifies a non-client mobile device seeking to establish a chain of peer-to-peer communications to access a network or a service provider.

In a further embodiment, if WAP host program 400 determines that there are zero client devices within peer-to-peer communication range of the mobile device hosting the WAP, then an instance of WAP host program 400 communicates with system 101 to obtain a map of locations of mobile devices that are requesting access to a network utilizing peer-to-peer communication and a WAP. Alternatively, an instance of WAP host program 400 executing on system 101 communicates location information of client devices seeking to access a network, such as via an installed app or via a free (e.g., no service resource usage) communication method. In response, an instance of WAP host program 400 on a mobile device receives the location information from system 101 and present via UI 206 the locations of client devices seeking network connections to the user of the mobile device that hosts a WAP.

In step 406, WAP host program 400 determines the requirements of the request to access the network. In an example, the requirements associated with a request to access a network can include, but is not limited to, bandwidth, service resource to utilize, a preferred networking protocol/standard (e.g., 3G, LTE), a peer-to-peer communication method, a connection duration, and security/encryption information. In one embodiment, an instance of WAP host program 400 determines the requirements of the request to access the network based on information received from a client device. In another embodiment, an instance of WAP host program 400 determines the requirements of the request to access the network based on information associated with a client device forwarded from system 101 to a mobile device hosting a WAP, such as device 130 via communication path 112A. In a further embodiment, a WAP host program 400 of a mobile device uploads at least one offer (e.g., cost) or constraint associated with a request to access a network to system 101. WAP host program 400 may include other requirements of the request to access a network to system 101.

In step 408, WAP host program 400 determines a fee to access a network. In one embodiment, WAP program 400 determines the fee to access a network and one or more service resources based on information received from a service provider. In one scenario, an instance of WAP host program 400 of the mobile device hosting a WAP forwards the fee information of the service provider to an instance of WAP client program 300 of the client device seeking access to a network and one or more service resources. In another scenario, WAP host program 400 forwards a fixed fee for network access and access to one or more service resources. In another scenario, WAP host program 400 utilizes program 208 of the mobile device hosting the WAP to negotiate one or more fees with a client device (previously discussed with respect to FIG. 3, step 306). In a related embodiment, an instance of WAP host program 400 of system 101 determines that compensation for a user of a mobile device that hosts a WAP for a service provider. Compensation for a user of a mobile device that hosts a WAP may be a monetary, a credit to the quotas of one or more service resources of the user, or a combination thereof. In an example, WAP host program 400 may set a quota compensation at a rate of 25% for talk-minutes (e.g., host quota increases 1 minute for each 4 minute a client utilizes) or a 10% remuneration for costs incurred by a user of the client device.

In various embodiments, an instance of WAP host program 400 determines the fee to access a network and one or more service resources and associated WAP compensation based on a supply and demand model. In one example, an instance of WAP host program 400 on system 101 determines the compensation for users hosting WAP based on a number of WAPs in an area relative to a number of client devices seeking to access the network and one or service resources. WAP host program 400 may utilize program 108 to adjust the compensation on a more granular basis, such as by the demand for a service resource and the number of WAPs available to process request for the service resource. A service provider of system 101 may offer WAPs a higher level of compensation for processing data requests as opposed to processing text messages.

In another embodiment combinable with previous embodiments, step 408 depicts an instance of WAP host program 400, on the host mobile device, executing an offer to use unutilized service resources of a quota of a user as opposed to a service provider. In an example, a user of device 140 indicates, based on user data 204, a quantity of service resources that the user is offering for compensation and one or more fee based options for the offered service resources. An instance of WAP host program 400 and an instance of program 208 associated with device 140 determines the fee for a client device (e.g., device 120) requesting access to a network. In some scenarios, WAP host program 400 of one mobile device negotiates one or more fees with an instance of WAP client program 300 of the client device (previously discussed with respect to FIG. 3, step 306).

In step 410, WAP host program 400 routes the request to access a network. Routing a request to a network includes utilizing one or more aspects of communication program 207 to establish one or more secure peer-to-peer communication paths between mobile devices, such as an ad-hoc VPN. In one embodiment, an instance of WAP host program 400 of a mobile device determines which one or more client devices obtains access to a network via a WAP. Based on the bandwidth and capabilities of the mobile device hosting the WAP, the mobile device of the WAP routes (e.g., process) multiple requests to access a network. In an example, an instance of WAP host program 400, executing on device 130, determines that device 130 can process text messages for device 120 via peer-to-communication path 113A, and process data requests for device 140 via peer-to-communication path 115.

Some embodiments, an instance of WAP host program 400 on system 101 determines to route requests to access the network. In an example, a single WAP cannot process the bandwidth of a request to access a network. WAP host program 400 of system 101 can identify multiple mobile devices hosting WAPs within communication range of the client device. Subsequently, WAP host program 400 of system 101 routes portions of the request to access the network to two or more WAPs and correspond instances of WAP host program 400. In an example, device 120 initiates a request to access a network that exceeds the bandwidth of device 120 and device 140 separately. WAP host program 400 of system 101 can interface with instances of WAP host program 400 on devices 130 and 140 to distribute the processing (e.g., bandwidth) of the request to access network 110 by device 120, such as via communication paths 113A and 112A for device 130 and communication paths 113B and 112B for device 140.

Still referring to step 410 in a further embodiment, one instance of WAP host program 400 determines that a corresponding mobile device (e.g., a first mobile) cannot directly access the network to process a request of a client device. However, the mobile device includes an instance of WAP client program 300. An instance of WAP host program 400, executing on a first mobile device, can interface with the instance of WAP client program 300 executing on the same mobile device, where the instance of WAP client program 300 identifies a second mobile device executing a respective instance of WAP host program 400. If the second mobile device can access network 110, then the first instance of WAP host program 400 forwards the request to access the network from the client device to the second mobile device. In an example, WAP host program 400 of device 140 receives a request from device 120 to access network 110; however, device 140 cannot access network 110. WAP host program 400 can establish communication path 114 (double headed dashed line) with device 120 and then forward the request to another WAP within range, such as device 130 via communication path 115. Subsequently, an instance of WAP host program 400 on device 130 can access network 110 via communication path 112A to process the request of device 120 to access the network and one or more service resources. Similarly, if the second mobile device cannot access the network but includes an instance of WAP client program 300, then the second mobile device can seek to find a third mobile device hosting a WAP, thus forming a chain of mobile devices to process a request to access a network.

In step 412, WAP host program 400 monitors access to a network. In one embodiment, an instance of WAP host program 400 on system 101 monitors access to the network by a plurality of mobile devices. WAP host program 400 monitors (e.g., meters, measures) the usage of one or more service resources to determine a rate of depletion for the excess quota of a service resource that the service provider is offering to non-subscribers. In another embodiment, an instance of WAP host program 400 on system 101 utilizes network 110 to monitor the locations of a plurality of users, both mobile devices hosting WAPs and client devices seeking access to a network and one or more service resources. In some embodiments, WAP host program 400 monitors access to a network based on one or more responses or messages associated with a communication, such as retry requests, rates of data transfer, etc.

In decision step 413, WAP host program 400 determines whether a change is identified that affects access to a network. Decision step 413 executes concurrently with the network communications and processing of one or more service resources associated with the request of the client device. In some embodiments, WAP host program 400 pauses at decision step 413. In one scenario, WAP host program 400 pauses at decision step 413 until a request to access a network and one or more service resources is complete. In another scenario, WAP host program 400 pauses to identify one or more changes that affects access to a network. In various embodiments, WAP host program 400 similarly determines whether a change is identified that affects access to the network as previously discussed with respect to FIG. 3, decision step 309. In other embodiments, an instance of WAP host program 400 determines that a change is identified that affects access to the network, such as system 101 determines that excess quota of one or more service resources is approaching depletion and restricts WAPs from processing additional requests to access the one or more affected (e.g., nearly depleted) service resources.

In decision step 413, responsive to determining that a change is not identified that affects access to a network (No branch, decision step 413), WAP host program 400 completes a transaction associated with the request to access a network (step 414).

In step 414, WAP host program 400 completes a transaction associated with the request to access a network. WAP host program 400 may utilize program 108 and other information to adjust the cost and/or compensation associated with users of mobile devices. Other information utilized by program 108 may include, but is not limited to, amount of a service resource utilized, percentage of communication processed by each utilized WAP, a determination of a successful processing of a request to access a network, and an actual communication speed as opposed to selected communication speed (e.g., requested 4G data transfer rate but received slower 3G data transfer rate).

In one embodiment, an instance of WAP host program 400 on system 101 determines that a request by a client device is complete and utilizes program 108 to obtain payment for the service provider. In one scenario, WAP host program 400 may utilize information included in the request to access the network to obtain payment from a user of a client device. In another scenario, WAP host program 400 may utilize information previous stored within user data 104 to obtain payment from a user of a client device. In another embodiment, in response to determining that a transaction is complete, an instance of WAP host program 400 on system 101 compensates one or more user of mobile devices that hosted the WAPs utilized by the client device.

In some embodiments, an instance of WAP host program 400 utilizes a third-party payment processing service to process payment for a completed transaction. In one scenario, if a service provider of system 101 cannot process payment from a user of a client device, then WAP host program 400 forwards the transaction for processing to a third-party payment service. In another scenario, WAP host program 400, executing on a mobile device submits information from a user of a client device to a third-party payment processing service to remunerate the user of the WAP for consumed service resources as opposed to the service provider. In some scenarios, the instance of WAP host program 400 associated with peer-to-peer communication chain links are remunerated at a different rate that the mobile device that accesses network 110.

Referring to decision step 413, responsive to determining that a change is identified that affects access to a network (Yes branch, decision step 413), WAP host program 400 transmits a notification (step 416).

In step 416, WAP host program 400 transmits a notification. Examples of notifications transmitted by WAP host program 400 may include notifications: indicating that the mobile device hosting the WAP is terminating peer-to-peer communications; a remaining duration of time that the WAP will access a network; the service plan of the mobile device is approaching a limit for a service resource, such as maximum number of text messages remaining; a service provider indicating locations for one or more new WAPs, etc. In another embodiment, WAP host program 400 transmits one or more notifications associated with a change that affects access to a network, such as a signal strength change. In some embodiments, an instance of WAP host program 400 on system 101 (e.g., the service provider) transmits a notification. In other embodiments, an instance of WAP host program 400 on a mobile device associated with peer-to-peer communications transmits a notification. In some scenarios, WAP host program 400 transmits a notification to a client device. In other scenarios, WAP host program 400 transmits a notification to one or more mobile devices hosting WAPs. In another scenario, an instance of WAP host program 400 transmits a notification to a set of mobile devices forming a chain of peer-to-peer communication links.

In decision step 417, WAP host program 400 determines whether to accept another request to access a network. In one embodiment, an instance of WAP host program 400 on system 101 determines to accept one or more other requests to access a network and a service resource based on determining that the service provider has excess quota available for the requested service resource. Alternatively, if the service provider does not have excess quota of a service resource, then the instance of WAP host program 400 does not accept another request associated with the service resource. In another embodiment, WAP host program 400 determines whether a mobile device that hosts WAP accepts another request to access a network based on whether the excess quota of a user of the mobile device is consumed (e.g., utilized). In some embodiments, WAP host program 400 determines whether a mobile device that hosts WAP accepts another request to access a network based the mobile device remaining active as a WAP. A mobile device may remain active as a WAP based on one or more factors, such as remaining battery life of the mobile device, bandwidth of the mobile device not utilized by activities of the user of the mobile device, and information input from a user of the mobile device.

In decision step 417, responsive to determining to accept another request to access a network (Yes branch, decision step 417), WAP host program 400 loops to step 402 to identify one or more changes to the information associated with one or more WAPs. In one embodiment, if the service provider has excess quota available for a service resource, then an instance of WAP host program 400 on system 101 accepts another request, associated with the service resource, to access the network. In another embodiment, if WAP host program 400 determines that excess quota of a service resource offered by a user of the mobile device is still available, then WAP host program 400 accepts another request to access a network that is associated with the service resource. In some embodiments, if WAP host program 400 determines that a mobile device remains active as a WAP, then WAP host program 400 accepts another request to access a network.

Referring to decision step 417, responsive to determining not to accept another request to access a network (No branch, decision step 417), WAP host program 400 terminates.

Figure 5:
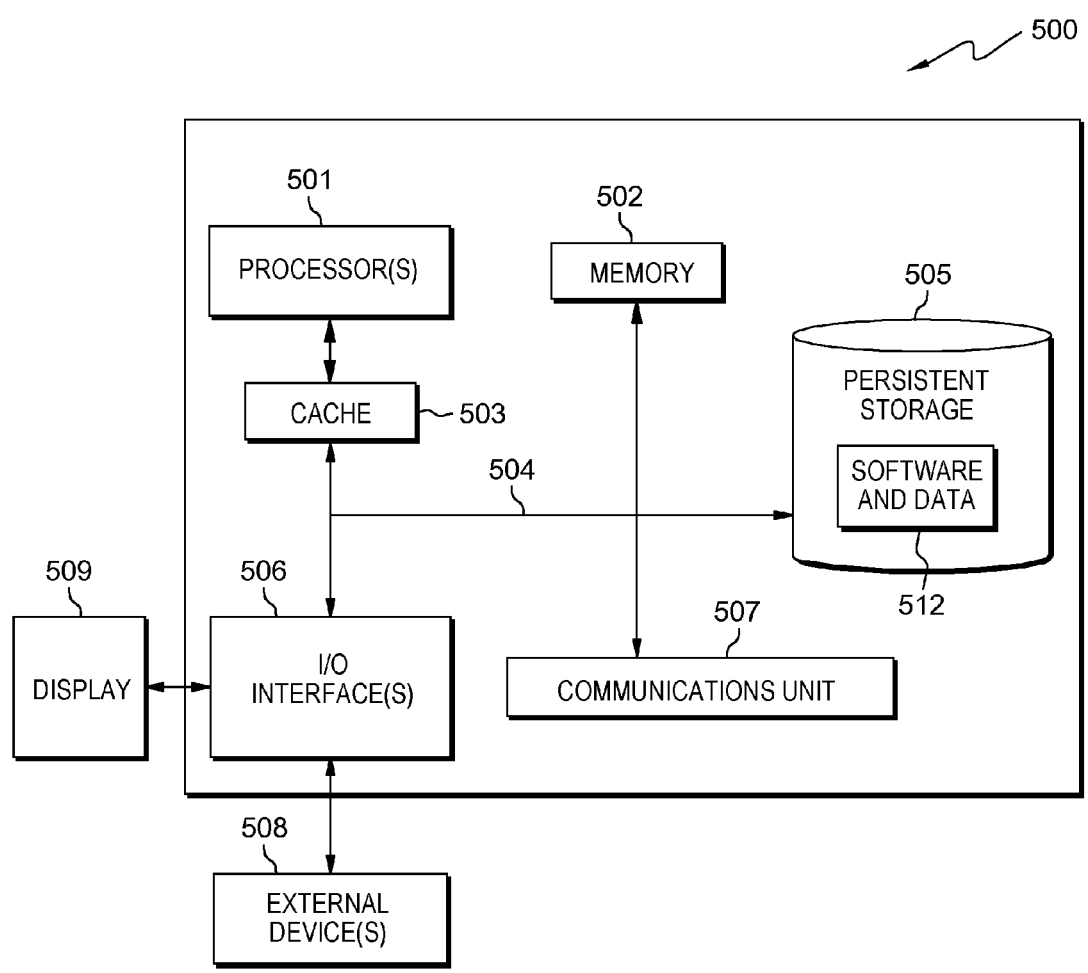
FIG. 5 is a block diagram of components of a computer, in accordance with an embodiment of the present invention.

FIG. 5 depicts a block diagram of computer system 500, which is representative of system 101, device 120, device 130, device 140, and device 150. Computer system 500 is an example of a system that includes software and data 512. Computer system 500 includes processor(s) 501, memory 502, cache 503, persistent storage 505, communications unit 507, input/output (I/O) interface(s) 506, and communications fabric 504. Communications fabric 504 provides communications between memory 502, cache 503, persistent storage 505, communications unit 507, and I/O interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information. In some embodiments, with respect to device 120, device 130, and/or device 140, data buffer 203 is allocated from a portion memory 502. In an embodiment, with respect to device 120, device 130, and/or device 140, data buffer 203 is allocated from a portion of persistent storage 505.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to system 101, software and data 512 includes: service plan information 103, user data 104, communication program 107, program 108, WAP host program 400, and various programs (not shown). With respect to device 120, device 130, and device 140 software and data 512 includes respective instances of OS 202, user data 204, apps 205A thru 205N, UI 206, communication program 207, program 208 and at least one of WAP client program 300 and/or WAP host program 400 and various programs (not shown).

Communications unit 507, in these examples, provides for communications with other data processing systems or devices, including resources of system 101, device 120, device 130, device 140, device 150, and/or network 110. In these examples, communications unit 507 includes one or more network interface cards and/or one or more wireless communication devices. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data 512 used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. In general, an embodiment, one embodiment, another embodiment, some embodiments, other embodiments, and various embodiments refer to one or more aspects of the present invention and are not intended to indicate mutually exclusive implementations. Further embodiments refers to one or more aspects of the present invention that build on one or more previously discussed embodiments. An alternative embodiment indicates an aspect of the present invention that is mutually exclusive of one or more aspects of the present invention. Many modifications and variations will be apparent to those of ordinary skill in the art without departing from the scope and spirit of the invention. The terminology used herein was chosen to best explain the principles of an embodiment, a practical application, a technical improvement over technologies found in the marketplace, or to enable others of ordinary skill in the art to understand the embodiments disclosed herein.

What is claimed is:

1. A method for accessing a network, the method comprising:
   receiving, by one or more computer processors, information related to a plurality of mobile devices, wherein information related the plurality of mobile devices includes information respectively associated with a mobile device that:
   (i) indicates whether the respective mobile device has access to a wireless network;
   (ii) identifies one or more protocols and related hardware of the respective mobile device to establish a secure, wireless peer-to-peer communication link to access the wireless network;
   (iii) identifies an amount of bandwidth, associated with the respective mobile device, available for transmitting the one or more communications from a first device to the wireless network; and
   (iv) identifies a location corresponding to the respective mobile device;
   identifying, by the one or more computer processors, a request from a first device to utilize wireless communication capabilities of a second device to communicate with the wireless network;
   in response to identifying the request from the first device to communicate with the wireless network, identifying, by the one or more computer processors, the second device from the plurality of mobile devices based on:
   (i) information identifying the one or more peer-to-peer communication protocols respectively associated with the first device and another mobile device;
   (ii) a location corresponding to the other mobile device; and
   (iii) information indicating a fee respectively associated with utilizing the wireless communication capabilities of the other mobile device;
   generating, by the one or more computer processors, a secure, wireless peer-to-peer communication link between the first device and the second device, wherein generating the secure wireless peer-to-peer communication link further comprising:
   allocating, by the one or more computer processors, a portion of storage included in the second device to isolate communications associated with the first device; and
   dictating, by the one or more computer processors, storage of one or more secure communications associated with the first device within the allocated portion of storage utilized to isolate communications associated with the first device;

receiving, by the one or more computer processors, to the second device, via the generated secure wireless peer-to-peer communication link, one or more communications from the first device;

establishing, by the one or more computer processors, a wireless communication link between the second device and the wireless network, wherein the wireless communication link between the second device and the wireless network includes a cellular communication link between the second device and a service provider associated with the second device; and transmitting, by the one or more computer processors, one or more communications within the dictated storage within the second device, to the wireless network, via the wireless communication capabilities of the second device.

* * * * *